United States Patent [19]

Parks, III et al.

[11] 3,810,102

[45] May 7, 1974

[54] SYSTEM FOR TRANSMISSION AND ANALYSIS OF BIOMEDICAL DATA

[75] Inventors: William Louis Parks, III, Bethesda; William Luster Grenoble, Jr., Rockville; Henry Herman Harjes, Jr., Clarksville; Lawrence James McCarthy, Rockville, all of Md.

[73] Assignee: Telserv, Inc., Rockville, Md.

[22] Filed: Mar. 31, 1972

[21] Appl. No.: 240,136

[52] U.S. Cl. .............................................. 340/172.5

[51] Int. Cl. ......... G06f 3/04, G06f 3/05, G06f 5/06

[58] Field of Search ............ 340/172.5; 179/15 BV, 179/15.55 R, 15 A, 2 A

[56] References Cited

UNITED STATES PATENTS

| | | | |
|---|---|---|---|
| 3,374,476 | 3/1968 | Cast | 340/172.5 |
| 3,634,625 | 1/1972 | Geohegan | 179/1 SA |
| 3,324,237 | 6/1967 | Cherry | 179/15.55 R X |
| 3,345,617 | 10/1967 | Cox | 340/172.5 |
| 3,566,365 | 2/1971 | Rawson | 340/172.5 |
| 3,674,939 | 7/1972 | Brooks | 179/15.55 R |
| 3,426,150 | 2/1969 | Tygart | 179/2 DP |
| 3,453,383 | 7/1969 | Schafer | 179/6.8 |

OTHER PUBLICATIONS

Crouch et al., "Electrocardiograms by Telephone," Feb. 1966.

Hagan et al., "Long Distance FM Telephone Transmission of Fetal Electrocardiogram," April 1963.

*Primary Examiner*—Gareth D. Shaw
*Attorney, Agent, or Firm*—Curtis Katz, Esq.

[57] ABSTRACT

A method and system for transmitting biomedical data to a remote station for subsequent processing. Analog electrical biomedical signals are sampled and digitized at a relatively low data rate and transmitted over a communications link of limited bandwidth to a remote station where the analog electrical biomedical signals are reconstructed from the digital data and are sampled and digitized at a substantially higher data rate for subsequent interpretation by a diagnostic computer. Alternatively, the received digital data are directly converted to a substantially higher digital data rate by means of a numerical algorithm, a form of digital interpolation.

11 Claims, 2 Drawing Figures

SYSTEM FOR TRANSMISSION AND ANALYSIS OF BIOMEDICAL DATA

BACKGROUND AND SUMMARY OF THE INVENTION

The present invention relates to a method and system for the transformation and transmission of biomedical data and the reconstruction, analysis and interpretation of same at a remote location.

In keeping with advances in technology, increasing interest has been evidenced in the central processing of biomedical data such as electroencephalograms (EEG's) and electrocardiograms (ECG's). It is estimated that upwards of 50,000,000 ECG's are taken each year in the United States. To analyze each of these requires several minutes of a physician's valuable time. This means that doctors spend millions of hours each year interpreting ECG's. If an economical method could be devised for interpreting ECG's automatically (e.g., by computer) then a substantial burden could be lifted from the physicians with a concomitant reduction in the cost of these medical services. It has also been estimated that 80 percent of all ECG's taken are within normal limits. Therefore, if a central diagnostic computer could be utilized to analyze these normal ECG's then the physicians would be able to devote more of their time to the study of abnormal heart wave patterns.

Another factor militating in favor of the central processing of biomedical data is that the majority of doctors are not specially trained in the interpretation of ECG's and EEG's and, therefore, many people live in areas remote from these specially trained physicians. If an economical system could be developed for centrally processing and interpreting EEG's and ECG's then most of the population of the United States would have readily available to it such skilled diagnostic services. Central processing and interpretation of biomedical data is practical from a time standpoint because normally there is no urgency associated with the interpretation of same. In the case of ECG's results obtained within a half day are usually entirely satisfactory. However, in an emergency, turn-around times of on the order of minutes are available and practical from a central computer.

In recognition of this need, some years ago the Department of Health, Education and Welfare undertook to develop computer programs to analyze and interpret biomedical data. Approximately 3 years ago diagnostic computer programs began to be made available to the public under the auspices of the Medical Systems Development Laboratory. One such program is Health Care Technology Division, 12 Lead ECG Analysis Program, Version D (41-44-25-11) which, when certified by the Health Care Technology Division is referred to as ECAN. For its operation the ECAN program requires that the electrical analog ECG signal be sampled at the rate of 500 times per second and each sample digitized by assigning to it a 10 bit digital number. Thus this program requires a relatively high 5,000 bit per second input data rate.

In order to make the use of these diagnostic ECG programs economical it is desirable that relatively large number of ECG's be centrally processed, otherwise it would be less expensive to have individual physicians interpret ECG's in the conventional manner. Thus there is a need to simply and inexpensively transmit the ECG data to a central computer programmed for diagnostic interpretation.

A conventional means for transmitting data to a remote location is the voice grade telephone line, especially when the Wide Area Telephone System (WATS) feature is utilized. The voice grade telephone line is, however, at best an imperfect and noisy medium of limited bandwidth of on the order of 3,000 Hz. Because of the modulation and detection limitations of transmission and receiving equipment, telephone line transmission of asynchronous digital data is limited to about 1,800 bits per second. It is therefore immediately apparent that the data rate mandated by diagnostic programs of on the order of 5,000 bits per second cannot be readily transmitted over conventional voice grade telephone lines. While multi-phase transmission schemes are not unknown, they are very expensive and are therefore not economically practical for the present purpose. Such sophisticated systems may cost several thousand dollars as contrasted to several hundred dollars for a conventional system.

A further characteristic of telephone lines is that the transmitted signals are multiplexed and at the point of decommutation are subject to carrier reinsertion jitter at a frequency of on the order of 5 Hz, which frequency overlaps the 3–7 Hz frequency of several important rhythmic heart waves. Finally, impulse noises, due for example to switching transients, occur in telephone lines and may appear as ectopic beats in an ECG.

Attempts have been made to transmit biomedical data to a remote receiver. One such system involves transmitting the original electrical analog wave form along with its first and second time derivatives. Such a transmission scheme, however, preserves only the zero crossing data and is unsuitable for use with diagnostic programs requiring digital data describing the full biomedical signal.

It is also known to transmit biomedical data over telephone lines by using the biomedical signal itself to modulate the frequency or the amplitude of a carrier wave. Transmission of biomedical data using amplitude modulation is unsuitable because an AM signal is subject to the noise and various transients present on the telephone lines which tend to degrade the transmitted data. Transmission of biomedical data using frequency modulation is unsatisfactory because of the pernicious effects of carrier reinsertion jitter described above. It has been discovered that transmission of biomedical data over telephone lines by frequency modulation of an audio carrier results in inaccuracies at the receiver of up to 10 percent of the time and it is not possible to determine which 10 percent of the data received are in error.

It is also known to transmit biomedical data over short ranges using VHF transmission with subsequent transmission over wires by RF. Such systems, however, are unsuitable for transmitting biomedical data long distances over the narrow bandwidth, noisy voice grade telephone lines.

In accordance with the present invention there is disclosed a method and system for simply and inexpensively transmitting biomedical data over a limited bandwidth communication channel to a remote, central diagnostic computer for analysis and interpretation of same. The present invention economically resolves the problems posed by the relatively high input data rate requirements of the diagnostic computer programs and the many infirmities of voice grade telephone lines as communications media. In accordance with the present invention the electrical analog biomedical signals are sampled at a relatively low frequency, e.g., on the order of 200 Hz, and digitized at a relatively low data rate, e.g., on the order of 1,600 bits per second, which is within the limited bandwidth of conventional voice grade telephone lines. At the remote central unit the received digital biomedical data are subjected to error control and then the data rate is substantially increased so as to meet the input data rate requirements of the particular diagnostic computer program utilized, e.g., on the order of 5,000 bits per second.

The data rate of the received digital biomedical data may be increased by operating upon said digital data in accordance with a numerical algorithm, a form of digital interpolation. Alternatively, the data rate of the received digital data to biomedical data may be increased by first converting this digital data to the corresponding analog form and then filtering, sampling and digitizing at a substantially higher data rate to meet the input data rate requirements of the selected diagnostic program.

In accordance with the present invention it has been discovered that it is possible to sample and digitize the original electrical analog biomedical signals at a lower data rate than that required by the selected diagnostic computer program and still satisfy the accuracy requirements of the diagnostic program. Thus while a given diagnostic program may mandate an input date rate of 5,000 bits per second, in accordance with this invention it is feasible to sample and digitize the analog biomedical data at a data rate of 1,600 bits per second, a data rate which is within the limited bandwidth of voice grade telephone lines. As disclosed herein, this data rate of approximately 1,600 bits per second can be increased at the central processing point, e.g., to 5,000 bits per second, as required by a particular diagnostic program, all without sacrificing the integrity of the data and without compromising the accuracy of the results obtained.

Disclosed herein, then, is a method and a system which permits full, inexpensive utilization of centralized, remote, computerized analysis and interpretation of biomedical data with all its attendant benefits.

BRIEF DESCRIPTION OF THE DRAWINGS

An illustrative embodiment of the invention is described in the following detailed specification which includes the drawings and wherein.

DETAILED DESCRIPTION

The invention can be most readily explained by means of an illustrative example which shows how the system is used to acquire, transform, transmit and reconstruct an ECG for subsequent analysis and interpretation by computer. In general, in the preferred embodiment the analog ECG signal is sampled and converted to a digital signal at a data rate of 1,600 bits per second and then stored on tape for subsequent transmission over telephone lines to a central station. At the central station the digital data are reconstructed to the 5,000 bit per second data rate required by the ECAN diagnostic program by means of a digital interpolation scheme.

Figure 1:
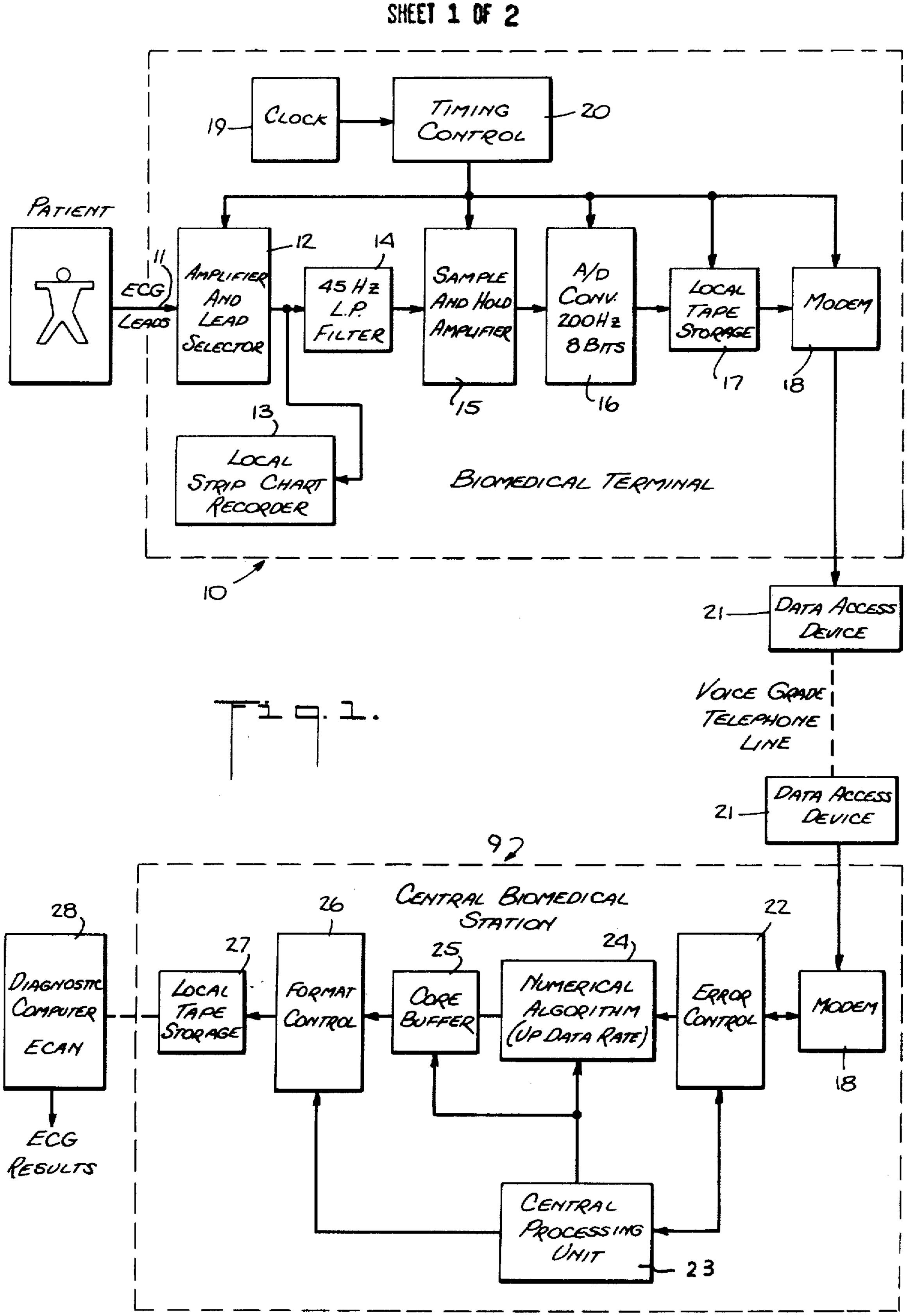
FIG. 1 is a schematic system block diagram of the preferred embodiment of the invention.

In FIG. 1 there is disclosed a biomedical terminal 10 which includes the apparatus necessary for taking an electrocardiogram and converting the analog electrical ECG signal to the desired digital form. The conventional ECG utilizes 12 leads which are designated I, II, III, *a*VR, *a*VL, *a*VF, $V_1$, $V_2$, $V_3$, $V_4$, $V_5$ and $V_6$. These leads are designated by the numeral 11 in FIG. 1 and the analog electrical signals present thereon are at a relatively low level, i.e., in the millivolt range. These low-level ECG signals are amplified and multiplexed by a conventional amplifier and lead selector 12 to generate about 4.5 second of ECG data per lead which may be interrupted between leads by various types of patient data. The amplifier and lead selector 12 should meet the American Hospital Association specifications for frequency response and safety.

The output of amplifier and lead selector 12 goes to a local strip chart recorder 13 for immediate display. This permits the individual taking the ECG to immediately observe the results of the ECG and provides a permanent record for the physician or hospital. The strip chart recorder 13 is conventional and has a frequency response of from DC to 100 Hz and should also meet Americal Hospital Association specifications.

The analog output of amplifier and lead selector 12 is also fed to a 45 Hz low pass filter 14 which functions to limit the bandwidth of the information which will ultimately be transmitted to and interpreted by the diagnostic program, e.g., ECAN. The use of such a filter is specified by the authors of the ECAN program and Medical Systems Development Laboratory has issued specifications for this preprocessing analog filter. In general, filter 14 comprises a 45 Hz 2-pole Butterworth low pass filter and serves to improve the signal-to-noise ratio of the data ultimately entered into the computer.

Sample and hold amplifier 15 samples the analog electrical ECG signal appearing at the output of filter 14, which signal has now been limited in bandwidth. Such sample and hold amplifiers are conventional and commercially available. One suitable sample and hold amplifier is manufactured by Varadyne Systems and is designated Model SHM-1.

The output of sample and hold amplifier 15 is digitized by A/D converter 16 at a data rate of 1,600 bits per second using 200 samples per second and an 8 bit code. The conventional strip chart record is 50 mm. wide which means that using an 8 bit code a resolution of one-fifth of a millimeter is obtained. Such A/D converters are also commercially available and a suitable one is made by Varadyne Systems and designated Model ADC-L8B. Thus the analog ECG signal has now been limited in bandwidth and digitized at the rate of 1,600 bits per second.

A convenient method of operation is to locally accumulate a number of ECG's before transmission to the central biomedical station. Therefore, local tape storage 17 is provided for that purpose. As pointed out previously, there is normally no great urgency associated with the interpretation of ECG's and it has been found to be more practical for a hospital to accumulate a number of ECG's for processing before transmitting same to a central station. Therefore, the parallel output of A/D converter 16 is transformed into a serial format with parity and recorded on local tape storage 17. Such local tape storage is conventional and may comprise, for example, a cassette tape deck with a Phillips-type cassette.

After a sufficient number of ECG's have accumulated in local tape storage 17 or after a specified amount of time has elapsed, the contents of local tape storage 17 are read out and transmitted to modem 18. "Modem" is the conventional terminology for a modulator/demodulator which converts digital data to a form suitable for transmission over telephone lines. The particular modem 18 employed in the instant invention utilizes frequency shift keying (fsk) to transform the digital data to acoustic data. Thus a binary 0 is converted into a burst of 1,200 Hz audio and a binary 1 becomes a burst of 2,200 Hz audio. Such a modem is commercially available from Vadic Corporation and is designated VA1200. This is a medium speed Bell 202 compatible modem utilizing frequency shift keying. Because of the relatively low data rate (1,600 bits per second) employed, the modem utilized can be both simple and inexpensive. For example, the Vadic VA1200 modem described costs only about $150. As pointed out above, it is highly desirable to have a simple, inexpensive system if the full range of benefits of computer interpretaion of biomedical data are to be realized.

The sequence of operations just described is performed under the guidance of clock 19 and timing and control unit 20 which may be of conventional design, the exact configuration being left to the discretion and preference of the user.

In order to transmit the fsk digital ECG output of modem 18 over telephone lines, a data access device (arrangement) 21 is required to interface with the modem 18 and the telephone line. Such a data access device is conventionally known as a "Carter" phone. As shown in FIG. 1 two such data access devices 21 are utilized, one at each end of the telephone communication channel. While FIG. 1 discloses a single voice grade telephone line linking the biomedical terminal 10 and the central station 9, it is within the scope of this invention to utilize several such links or to utilize such a link in combination with one or more wide band communication channels.

Central biomedical station 9 includes the apparatus required to convert the 1,600 bit per second digital ECG information to the form required for use by the selected diagnostic program. As previously described, the ECAN program requires that the ECG signal be sampled at 500 Hz to generate a 5,000 bit per second data rate.

Modem 18 of central station 9 receives the data from data access device 21 and converts the data from fsk form to serial digital form. Modem 18 also functions as a control interface for the data access device 21.

The serial digital data output of modem 18 is operated upon by error control 22 in conjunction with central processing unit 23, which may be a Varian 620*i* mini-computer. The incoming digital data are checked for parity by error control 22. In the event of a parity error central processing unit 23 instruct local tape storage 17 to rewind and retransmit the data. In addition, error control 22 converts the serial digital data from modem 18 to parallel format for up-conversion to a higher data rate required by the diagnostic program. Finally, error control 22 operates to synchronize the receiving clock (not shown) to the transmitted data. To accomplish the up-conversion of the data rate from 1,600 bits per second to 5,000 bits per second the central processing unit 23 effects a form of digital interpolation.

Both analog and digital interpolation techniques are known in the art. A conventional analog technique involves pulse stretching (holding) by a D/A converter after which the information is smoothed out by passing it through a low pass filter. Other interpolation schemes include step interpolation and linear interpolation, the latter being a form of digital interpolation using two samples to determine secondary points along a straight line between two samples.

A more sophisticated interpolation technique is digital interpolation. Digital interpolation involves the calculation of secondary points between primary or sampled original data points. Digital interpolation may be of the first order utilizing three samples and inserting one secondary point between each two samples. The wave form is reconstructed by connecting secondary points and the original sample points with straight lines. A more sophisticated form of digital interpolation utilizes four samples wherein three secondary points are placed between each two samples. This third order, four point digital interpolation technique is the preferred technique for reconstructing the 1,600 bit per second incoming digital data to the 5,000 bit per second data required by the ECAN program.

A discussion of sampling and reconstruction techniques is contained in "SAMPLING AND SOURCE ENCODING," by Lawrence W. Gardenhire, Radiation, Inc. (April 1970). The third order, four point digital interpolation scheme of the preferred embodiment of this invention permits reconstruction with enhanced accuracy, even at lower sampling rates.

As described above, digital interpolation involves the calculation of secondary points between sampled original data points. The secondary points are calculated by weighting the values of the data points according to their correlation with the data at the time of secondary point evaluation. The near optimum weighting factors for a third order four point reconstruction are as follows:

$$W_1(\tau_r) = -1/16 + 1/24(\tau_r/T_s) + 1/4(\tau_r/T_s)^2 - 1/6(\tau_r/T_s)^3$$

$$W_2(\tau_r) = 9/16 - 9/8(\tau_r/T_s) - 1/4(\tau_r/T_s)^2 + 1/2(\tau_r/T_s)^3$$

$$W_3(\tau_r) = 9/16 + 9/8(\tau_r/T_s) - 1/4(\tau_r/T_s)^2 - 1/2(\tau_r/T_s)^3$$

$$W_4(\tau_r) = -1/16 - 1/24(\tau_r/T_s) + 1/4(\tau_r/T_s)^2 + 1/6(\tau_r/T_s)^3$$

In the above weighting factors $T_s$ is the time between samples and $\tau_r$ is the selected distance of the secondary point from the median between two samples. The amplitude of the secondary point is computed by multiplying $W_1$ times the amplitude of sampled point 1, $W_2$ times the amplitude of sampled point 2, etc., and summing the results. This, then, is the numerical algorithm or calculation for the preferred digital interpolation technique. Other digital interpolation schemes are known and may, of course, be utilized.

The digital data, which are now at a 5,000 bit per second data rate, are sent to core buffer 25 where the data are buffered so that they appear in the time sequence necessary for subsequent recording. These buffered data are then subjected to format control 26 where they are placed in the format required by the ECAN program and for recording.

Finally, the formated 5,000 bit per second ECG digital data are recorded on a local, IBM compatible tape deck. This is a standard nine track, 800 BPI, 360 compatible tape recorder. After a sufficient number of ECG's have been accumulated in local tape storage 27, this information is then transmitted to and interpreted by a diagnostic computer 28 containing, e.g., an ECAN program. The information may be transferred to the dianostic computer either by physically transporting the tape removed from local tape storage to the diagnostic computer 28 or by transmitting the information over a relatively wide band communication link.

The actual results of the interpretation of the ECG data by the ECAN program appear as a computer printout containing not only a recitation of specific abnormalities observed in the wave form but also suggested possible diagnoses. The results are returned to the physician by, for example, a Xerox dataphone.

Figure 2:
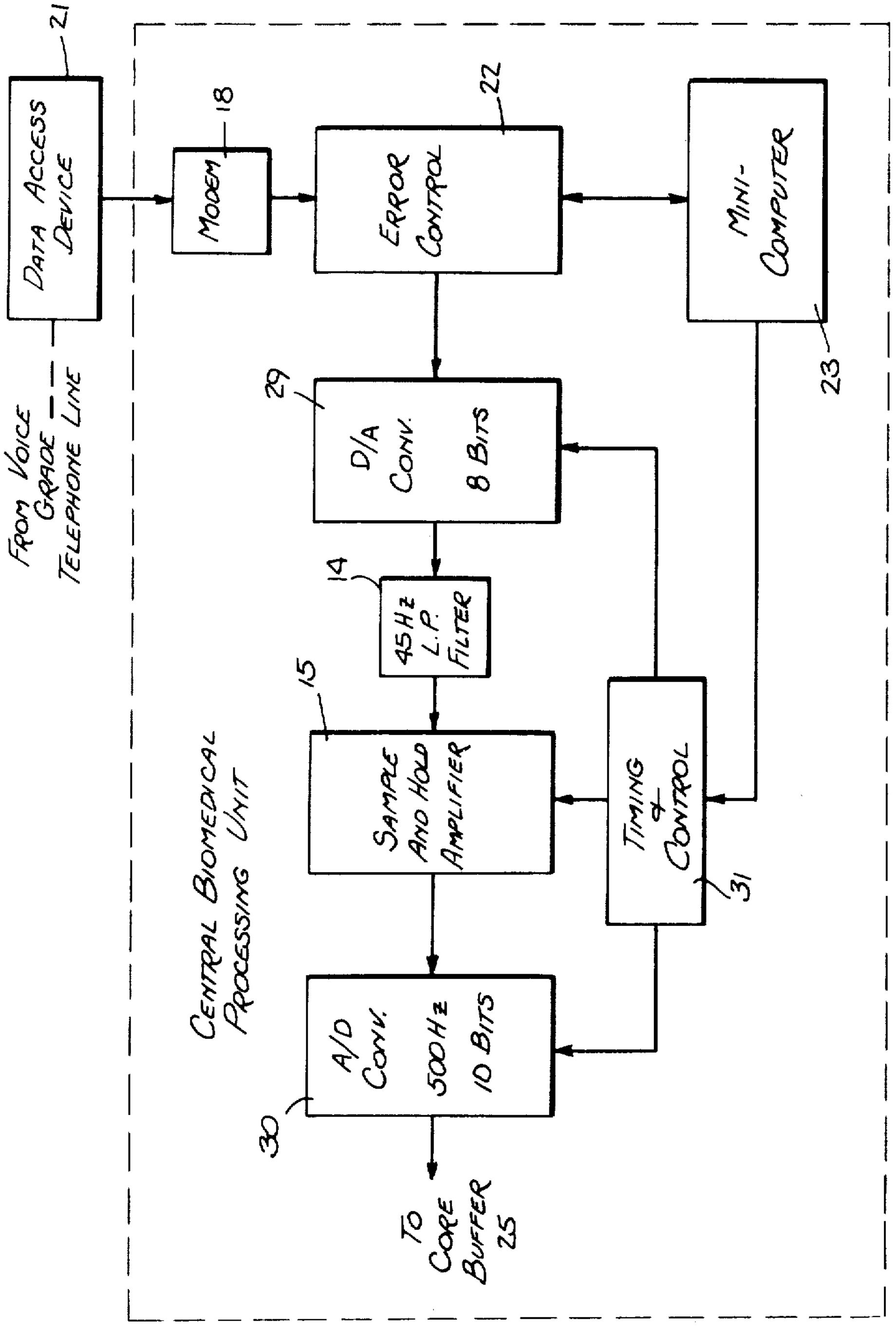
FIG. 2 is a schematic block diagram of an alternative embodiment of the invention.

An alternative embodiment of the invention is illustrated in FIG. 2 wherein a different scheme for up-converting the 1,600 bit per second data rate is disclosed. In FIG. 2 the data access device 21, modem 18 and error control 22 operate as described above in connection with FIG. 1. Thus the output of error control 22 is digital ECG data in 8 bit parallel form. These data are received by D/A converter 29 which converts the data from digital to analog form. Such a D/A converter is conventional and a suitable one is manufactured by Varadyne Systems under the designation Model DAC-HI.

The analog ECG signal appearing at the output of D/A converter 29 is processed by a 45 Hz low pass filter 14 identical to that described in connection with FIG. 1 in order to limit the bandwidth of the information ultimately transmitted to diagnostic computer 28 for use with the diagnostic program. This analog ECG signal is forwarded to a sample and hold amplifier 15, identical to that in FIG. 1.

The sampled analog ECG signal is digitized at a rate of 5,000 bits per second by A/D converter 38 which operates at 500 Hz and 10 bits as required by the ECAN program. Such an A/D converter is conventional and is manufactured by Varadyne Systems and designated Model ADC-L10B. The output of A/D converter 30, then, is a 5,000 bit per second digital ECG signal which is sent to core buffer 25 and processed in the same manner as described above in connection with FIG. 1. The operations described are performed in accordance with a timing and control unit 31, the particular configuration of which is left to the discretion of the user.

There are, of course, errors introduced in the process of reconstructing the 1,600 bit per second received digital signal to the higher data rate required by the diagnostic program. In accordance with the reconstruction techniques disclosed for use in the present invention, the errors generated are such that they do not adversely affect the validity of the results obtained using the ECAN program. For an analysis of errors introduced in D/A conversions of this type see "DYNAMIC RECONSTRUCTION ERRORS IN DIGITAL-TO-ANALOG SYSTEMS WITH BIOMEDICAL APPLICATIONS," William P. Dotson, Jr., Manned Spacecraft Center, Houston Texas (April 1971).

The invention is more particularly defined in the claims.

We claim:

1. A method for digitizing analog biomedical data and transmitting the resulting digital data over a limited bandwidth communication channel for subsequent analysis and interpretation by a diagnostic computer program having an input data rate requirement which exceeds the bandwidth of said communication channel, including the steps of:

a. sampling and digitizing said analog biomedical data at a data rate below the input data rate requirements of said diagnostic program but within the bandwidth of said communication channel;
b. transmitting said digital data samples over said limited bandwidth communication channel;
receiving said transmitted digital data samples; and
d. increasing the data rate of said received digital biomedical data to render it compatible with the input data rate requirement of said diagnostic computer program by interpolating at least one secondary sample between adjacent received digital data samples.

2. The method of claim 1 wherein the step of increasing the data rate of said received digital biomedical data includes the step of interpolating three secondary samples between adjacent received digital data samples.

3. A method for digitizing analog biomedical data and transmitting the resulting digital data over a limited bandwidth communication channel for subsequent analysis and interpretation by a diagnostic computer program having an input data rate requirement which exceeds the bandwidth of said communication channel, including the steps of:

a. sampling and digitizing said analog biomedical data at a data rate below the input data rate requirement of said diagnostic program but within the bandwidth of said communication channel;
b. transmitting said digital biomedical data over said limited bandwidth communication channel;
c. receiving said transmitted digital biomedical data;
d. reconstructing said analog biomedical data from said digital biomedical data; and
e. sampling and digitizing said reconstructed analog biomedical data at a data rate compatible with the input data rate requirement of said diagnostic computer program.

4. A method for digitizing analog biomedical data and transmitting the resulting digital data over a limited bandwidth communication channel for subsequent analysis and interpretation by a diagnostic computer program having an input data rate requirement which exceeds the bandwidth of said communication channel, including the steps of:

a. sampling said analog biomedical data at a frequency of on the order of 200 Hz.
b. digitizing said sampled biomedical data at a data rate of on the order of 1,600 bits per second which is substantially below the input data rate requirement of said diagnostic program but within the bandwidth of said communication channel;
c. transmitting said digital data samples over said communication channel, at least one portion of which comprises a voice grade telephone line;
d. receiving said transmitted digital data samples; and
e. increasing the data rate of said received digital biomedical data to render it compatible with the input data rate requirements of said diagnostic computer program by interpolating at least one secondary sample between adjacent received digital data samples.

5. The method of claim 4 wherein the step of increasing the data rate of said received digital biomedical data includes the step of interpolating three secondary samples between adjacent received digital data samples.

6. A system for digitizing analog biomedical data and transmitting the resulting digital data over a limited bandwidth communciation channel for subsequent analysis and interpretation by a diagnostic computer program having an input data rate requirement which exceeds the bandwidth of said communication channel, including:

a. sampling means for sampling said analog biomedical data at a frequency of on the order of several hundred Hz;
b. digitizing means operably connected to said sampling means and responsive thereto for converting said analog data samples to digital data samples at a data rate below the input data rate requirement of said diagnostic program but within the bandwidth limits of said communication channel;
c. transmitting means operably connected to said digitizing means and responsive thereto for transmitting said digital biomedical data over said communication channel;
d. receiving means operably connected to said communication channel for receiving said digital biomedical data from said communication channel; and
e. data processing means operably connected to said receiving means and responsive thereto for interpolating at least one secondary sample between adjacent received digital data samples so as to increase the data rate of said received digital biomedical data to thereby render it compatible with the input data rate requirement of said diagnostic computer program.

7. A system according to claim 6 wherein said data processing means includes means for interpolating three secondary samples between adjacent received digital data samples.

8. A system according to claim 6 wherein at least one portion of said communication channel comprises a voice grade telephone line.

9. A system according to claim 6 wherein said biomedical data comprises electrocardiogram data and wherein said diagnostic computer program is an ECAN program.

10. A system for digitizing analog biomedical data and transmitting the resulting digital data over a limited bandwidth communication channel for subsequent analysis and interpretation by a diagnostic computer program having an input data rate requirement which exceeds the bandwidth of said communication channel, including:

a. first sampling means for sampling said analog biomedical data at a frequency of on the order of several hundred Hz;
b. first digitizing means operably connected to said first sampling means and responsive thereto for converting said analog data samples to digital data samples at a data rate below the input data rate requirement of said diagnostic program but within the bandwidth limits of said communication channel;
c. transmitting means operably connected to said first digitizing means and responsive thereto for transmitting said digital biomedical data over said communication channel;
d. receiving means operably connected to said communication channel for receiving said digital biomedical data from said communication channel;
e. digital to analog converting means, including filtering means, operably connected to said receiving means and responsive thereto for reconstructing said analog biomedical data;
f. second sampling means operably connected to said digital to analog converter means and responsive thereto for sampling said reconstructed analog biomedical data; and
g. second digitizing means operably connected to said second sampling means and responsive thereto for digitizing said sampled reconstructed analog data at a data rate compatible with the input data rate requirement of said diagnostic computer program.

11. A system according to claim 10 wherein said second sampling means and said second digitizing means produce a digital data rate of on the order of 5,000 bits per second.

* * * * *